United States Patent [19]
Earle

[11] Patent Number: 5,622,479
[45] Date of Patent: Apr. 22, 1997

[54] COMPOSITE DEVICE FOR A FLUID SYSTEM OF A VEHICLE

[75] Inventor: Stephen R. Earle, Pudsey, Great Britain

[73] Assignee: WABCO Automotive UK Limited, United Kingdom

[21] Appl. No.: 389,702

[22] Filed: Feb. 14, 1995

[30] Foreign Application Priority Data

Feb. 15, 1994 [GB] United Kingdom ............... 9402828

[51] Int. Cl.⁶ ............................................. F04B 53/16
[52] U.S. Cl. ....................... 417/231; 417/364; 417/534; 417/DIG. 1
[58] Field of Search ....................... 417/231, 364, 417/437, 534, DIG. 1; 248/631, 636, 638

[56] References Cited

U.S. PATENT DOCUMENTS

| | | | |
|---|---|---|---|
| 2,022,643 | 11/1935 | Hueber | 417/534 |
| 3,584,982 | 6/1971 | Siegel | 417/464 |
| 4,679,994 | 7/1987 | Brown | 417/DIG. 1 |
| 5,360,324 | 11/1994 | Levington et al. | 417/534 |

FOREIGN PATENT DOCUMENTS

| | | | |
|---|---|---|---|
| 2504988 | 11/1982 | France | 417/534 |
| 2182398 | 5/1987 | United Kingdom | 417/534 |

OTHER PUBLICATIONS

Modern Plastics Encyclopedia, p. 10, McGraw Hill, Inc. Oct. 1991.

*Primary Examiner*—Timothy Thorpe
*Assistant Examiner*—Roland G. McAndrews, Jr.
*Attorney, Agent, or Firm*—Stroock & Stroock & Lavan

[57] ABSTRACT

A device (10), and a method for forming such a device (10), for a fluid system for a vehicle, comprises first and second members (12, 13). The first member (12) is adapted for direct mounting on the chassis or engine of a vehicle (11); the second member (13) defines at least part of a leak tight fluid chamber (15) of the device (10). The first member (12) is of a thermoset material suitable for withstanding operating conditions and loads associated with direct mounting of the device (10) on the chassis or engine (11), and the second member (13) is of a thermoplastic material suitable for welding to ensure leaktightness of a fluid chamber (15). The second member (13) is interlocked with the first member (12) during moulding thereof.

9 Claims, 2 Drawing Sheets

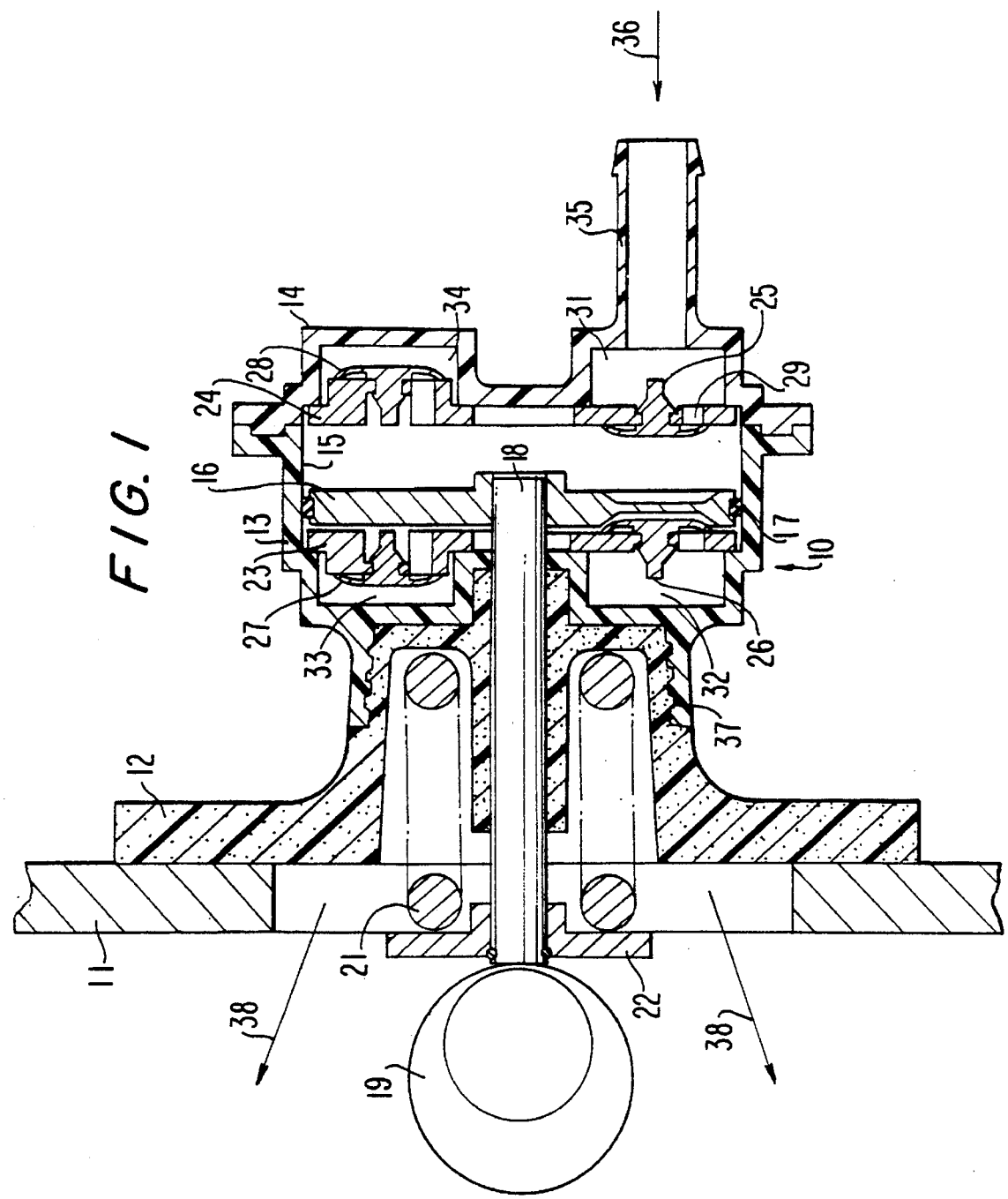

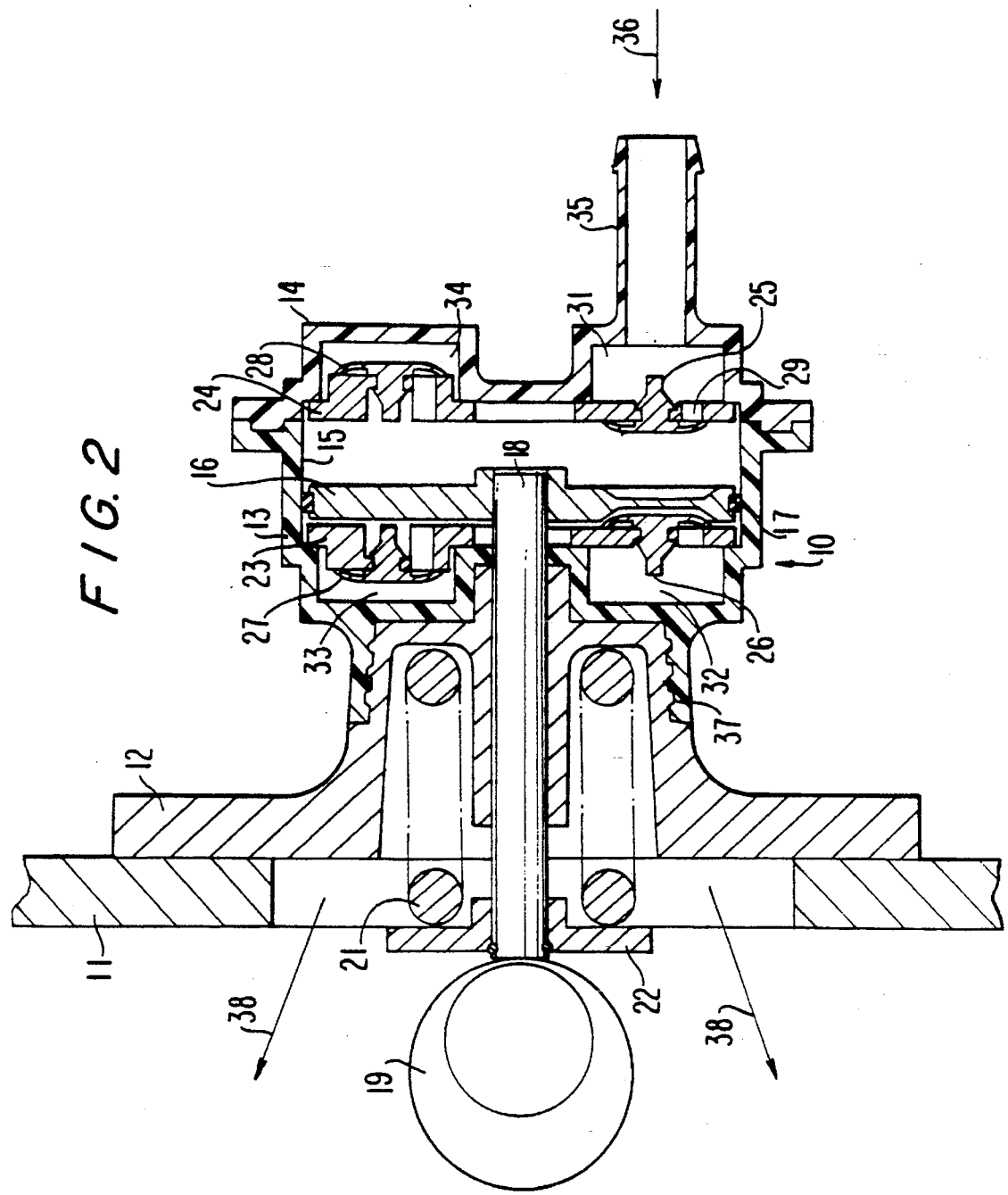

COMPOSITE DEVICE FOR A FLUID SYSTEM OF A VEHICLE

TECHNICAL FIELD

The present invention relates to a device for a fluid system of a vehicle, and particularly to a device for mounting directly on the engine, chassis or body of a vehicle. The present invention also relates to a method of manufacture of such a device.

BACKGROUND OF THE INVENTION

Most passenger car and commercial vehicles have fluid systems such as a servo-assisted or power operated braking system. These systems include devices such as master cylinders, vacuum pumps, valves and compressors, some of which are driven by an internal combustion engine of the vehicle. In many cases, it is necessary to mount such devices directly on the engine, chassis or body of the vehicle, and this often results in part of the device being overspecified for the task which it must undertake. For example, valves of vacuum pumps may have a housing of cast iron simply because the body of the pump requires the strength and stability of cast iron, and because of additional assembly costs it is not convenient or practicable to make a valve housing of a more suitable and economical material, such as a thermoplastic.

Engine or chassis mounted devices have a moderately severe operating environment. They are exposed to vibration from the engine, and in the case of engine mounted devices, they are exposed to relatively high temperatures. Heat can be transferred from the engine to the engine mounted device either directly from the mounting flange, or indirectly hot engine oil.

For reasons of manufacturing ease and precision many engine and chassis mounted components for fluid systems are nowadays assembled but particular attention must be paid to sealing to prevent air and oil leaks. Usually elastomeric seals must be provided between component parts, but such assembled joints are not ideal and can be particularly troublesome in a high vibration environment; furthermore assembled joints require a larger number of components which inevitably increases manufacturing, stocking and assembly costs.

The use of plastics materials for engine and chassis mounted components has been contemplated in the past, but has shown no significant advantage over components made of for example cast iron or aluminium. Fasteners and flexible seals must be provided to hold together component parts of devices of fluid systems. Furthermore in structural applications plastics materials must have a large percentage of e.g. glass filler in order to exhibit the necessary resistance to creep.

This is especially true in high temperature/high stress applications. Plastics have been used for components having relatively low stress loadings, such as fluid reservoirs of brake master cylinders, and are sometimes welded. Such plastic parts are usually assembled in a conventional manner with fasteners and seals. However parts having a high filled content (such as those suitable for direct attachment to engine or chassis) are extremely difficult to weld since the plastic content is low, and thus fasteners and seals must again be provided, which necessarily increases manufacturing and assembly costs.

Thus, plastics have been used only for very specific applications where the disadvantages do not outweigh the advantages of, for example, reducing the weight of the finished article or improving the aesthetic appearance thereof, and have seldom been used for structural components.

Notwithstanding these Problems, the applicants have invented a form of construction for a device of a fluid system which is suitable for automotive applications and is best able to take advantage of the most appropriate materials whilst using thermoplastic for components which are not heavily stressed, such as fluid reservoirs.

SUMMARY OF THE INVENTION

According to the invention there Is provided a device for a fluid system of a vehicle, the device comprising first and second members, the first member being adapted for the second member defining at least part of a leak tight fluid chamber of the device, wherein the first member is of a dimensionally and thermally stable material suitable for withstanding operating conditions and loads associated with mounting of the device on a chassis body or engine of a vehicle, and the second member is of a thermoplastic material suitable for welding to ensure leaktightness of a fluid chamber, said second member being interlocked with said first member during moulding of the second member.

Such a construction permits the first member to have the requisite strength and toughness to support fixing and operational loads. In the case where the device is operated directly from the engine such a first member can also resist high heat loadings and attack from lubricants. The first member may be of metal for example cast iron or aluminium, or may be a thermoset plastics material which typically may have a rather high filler content.

In contrast the second member can be of a thermoplastic material, and thus constituent parts of said second member are suitable for welding to permit formation of a fluid chamber without the need for secondary elastomeric seals and fasteners.

The second member is preferably moulded directly onto the first member, the moulding temperature of thermoplastic materials being substantially less than the temperature at which materials which are suitable for the first member degrade.

Preferably the first member includes an anchoring member having one or more discontinuities to anchor said second member after moulding. In a preferred embodiment the first member has one or more protuberances around which said second member is moulded. The first member may have one or more substantially continuous protuberances around the periphery thereof. The protuberances may comprise ribs. The anchoring member may be cylindrical. Preferably the ribs are circumferential and circular about the periphery of the anchoring member. Alternatively, the ribs may form a helical thread.

In an alternative embodiment the discontinuities comprise cavities in the periphery of the anchoring member, the second member being moulded into the cavities to anchor said second member after moulding.

In another aspect the invention provides a method of forming a device for a fluid system and comprising the step of moulding a second member of thermoplastic material directly onto a first member, the temperature at which the first member degrades being substantially higher than the moulding temperature of the second member.

The invention also provides a method of forming a device for a fluid system comprising moulding a second member of thermoplastic material onto a first member of a dimensionally and thermally stable material, and welding one or more further parts of thermoplastic material to the second member to define at least part of a fluid chamber.

In a preferred embodiment the device is a vacuum pump for direct attachment to an engine of a vehicle, wherein the second member comprises a cylinder body and a cylinder cover, said cylinder body and cylinder cover being welded to provide a leak tight pumping chamber, said pumping chamber including inlet and outlet and valve means, and having a piston reciprocal in the chamber.

Preferably the valve means comprise a valve plate having an aperture therein and a valve member to open and close the aperture. The valve plate may include more than one aperture and valve member, and preferably the valve plate includes an inlet valve and an outlet valve.

The valve plate is preferably of thermoplastic material and is welded to the cover or to the cylinder body to form a leak tight connection. In the preferred embodiment the pump is double acting, a valve plate being welded to both the cylinder body and to the cover. In the preferred embodiment said valve plate includes two inlet valves and two outlet valves.

The invention also provides a method of forming a pumping chamber of a vacuum pump comprising welding a cylinder cover to a cylinder body, both cover and body being of thermoplastic material having a low filler content. The inventive method further includes welding one or more valve plates of thermoplastic material to the cylinder body and/or cover, the valve plates defining apertures to be closed by valve members of the pumping chamber.

BRIEF DESCRIPTION OF THE DRAWING

Other aspects of the invention will be apparent from the following description of a preferred embodiment illustrated by way of example only in the accompanying drawings in which:

FIG. 1 is a schematic transverse section through a vacuum pump according to the invention.

FIG. 2 is a part-schematic transverse section through a vacuum pump constructed in accordance with a second embodiment of the invention

DESCRIPTION OF PREFERRED EMBODIMENT with reference to the drawing, a vacuum pump 10 is mounted in any suitable manner (e.g. threaded fasteners) to the crankcase or cylinder head 11 of an internal combustion engine.

The pump 10 comprises a base 12, a body 13 and a cover 14 to be described in detail below. The body 13 defines a bore 15 in which a piston 16 reciprocates. The piston 16 forms a gas tight seal with the bore 15 and may include a peripheral elastomeric seal 17 of any suitable kind.

The piston 16 is driven outwardly of the engine by means of a pushrod 18 and engine driven camshaft 19. The pushrod 18 is held in contact with the camshaft by a return spring 21 acting between the pump base 12 and a pushrod spring retainer 22, and thus returns the piston inwardly. The stroke of the pump is determined by the eccentricity of the camshaft.

The pump body 13 and cover 14 include valve plates 23, 24 having conventional one-way valves 25-28 therein. The valves each include a flexible lip which opens under a pressure differential to allow fluid flow through several circumferentially spaced ports (e.g. 29). A pressure differential acting on the head of a respective valve urges the valve lip into sealing contact with the respective valve plate.

The pump body and cover also define chambers 31-34 adjacent each valve. Chambers 31 and 32 are coupled by a conduit (not shown) and are connected to an inlet pipe 35 for attachment to a vacuum reservoir or vacuum user (not shown). Chambers 33 and 34 are also connected and communicate through passages (not shown) in the pump body 13 and base 12 with the interior of the engine.

In operation the piston 16 reciprocates under the action of the camshaft 19. On an inward stroke, valve 25 opens to suck air from the inlet pipe 35, and valve 27 opens to expel air from the underside of the piston to exhaust. On the outward stroke, valve 26 opens to suck air from the inlet pipe 35, and valve 28 opens to expel air from the upper side of the piston to exhaust. Air flow is indicated by arrows 36 and 38.

The pump is thus double acting, but the present invention is equally applicable to single acting pumps.

The pump base 12 is of a dimensionally and thermally stable material, and may for example be of aluminum (FIG. 2) or of a highly filled thermoset plastic. Thermoset plastics are relatively rigid and have good resistance to creep under high temperature and high loading conditions. If of thermoset material, the pump base may include a high proportion of glass filler to improve stability and resistance to creep, and may for example be of a glass filled phenolic material.

The pump body 13, cover 14 and valve plates 23, 24 are of thermoplastic material. Thermoplastic materials are relatively inexpensive and provided the filler content is not high, thermoplastics can be readily welded to one another by ultrasonic or vibration welding methods. 30% filled nylon or polyester may be a suitable thermoplastic material In the preferred method of construction the pump base 12 is moulded in a suitable thermoset material or cast in aluminum, and then transferred to a second station where the thermoplastic pump body is directly moulded thereon. Discontinuities 37 of the pump base provided an anchorage for the pump body. The respective valve plates are welded to the pump body and cover, the piston and pushrod assembly inserted and the cover welded to the body to complete assembly of the pump.

Welding of the thermoplastic components ensures an excellent gas tight seal without the necessity for additional elastomeric sealing members and fasteners. Furthermore the moulding technique, and welding of the thermoplastic chamber eliminates the possibility of incorrect assembly of sealing components, and ensures that the pump cannot be disassembled for unauthorized service or repair. Such an advantage is particularly important where the device is used in a safety critical system, such as the braking system of a vehicle. The moulding technique has the particular advantage that point attachments are avoided, thus providing for even distribution of loads applied to the thermoplastic component part.

It will be appreciated that other possibilities fall within the spirit and scope of the invention herein disclosed.

I claim:

1. A device for a fluid system of a vehicle, the device comprising first and second members, the first member being mounted on at least one of a chassis, body and engine of a vehicle to provide a substrate, and the second member defining at least part of a leak tight fluid chamber of the device, wherein the first member is formed of a material which remains rigid and resists creep when exposed to heat and vibration associated with mounting of the device on at least one of a chassis, body and engine of a vehicle, and the second member is of a thermoplastic material suitable for welding to ensure leaktightness of the fluid chamber, said second member being interlocked with said first member during molding of the second member.

2. The device of claim 1 wherein the first member is of aluminum and the second member is of thermoplastic material, the constituent parts of said second member being suitable for welding to permit formation of a fluid chamber.

3. The device of claim 1 wherein the entire second member is molded simultaneously with the second member interlocking with the first member.

4. The device of claim 1 comprising a vacuum pump for direct attachment to an engine of a vehicle, wherein the second member comprises a cylinder body and a cylinder cover, said cylinder body and cylinder cover being welded to provide a leak tight pumping chamber, said pumping chamber including inlet and outlet and valve means, and having a piston reciprocal in the chamber.

5. The device of claim 4 further comprising a valve plate having an aperture therein and a valve member to open and close the aperture, said valve plate being of thermoplastic material and welded to at least one of the cover and the cylinder body to form a leak tight connection.

6. A device for a fluid system of a vehicle, the device comprising first and second members, the first member being mounted on at least one of a chassis, body and engine of a vehicle, the second member defining at least part of a leak tight fluid chamber of the device, wherein the first member is formed of a material which remains rigid and resists creep when exposed to heat and vibration associated with mounting of the device on at least one of a chassis, body and engine of a vehicle, and the second member is of a thermoplastic material suitable for welding to ensure leaktightness of the fluid chamber, said second member being interlocked with said first member during molding of the second member; the first member being of a highly filled thermoset material, and the second member being of a thermoplastic material having a lower filler content than the first member, said second member being suitable for welding to permit formation of a fluid chamber.

7. A device for a fluid system of a vehicle, the device comprising first and second members, the first member being mounted on at least one of a chassis, body and engine of a vehicle, the second member defining at least pan of a leak tight fluid chamber of the device, wherein the first member is formed of a material which remains rigid and resists creep when exposed to heat and vibration associated with mounting of the device on at least one of a chassis, body and engine of a vehicle and the second member is of a thermoplastic material suitable for welding to ensure leaktightness of the fluid chamber, said second member being interlocked with said first member during molding of the second member; the first member including an anchoring member having one or more discontinuities to anchor said second member after molding.

8. The device of claim 7 wherein the first member has one or more protuberances around which said second member is moulded.

9. The device of claim 8 wherein the first member has one or more substantially annular protuberances around the periphery thereof.

* * * * *